(12) United States Patent
Chen

(10) Patent No.: US 6,854,882 B2
(45) Date of Patent: Feb. 15, 2005

(54) RAPID RESPONSE ELECTRONIC CLINICAL THERMOMETER

(75) Inventor: Ming-Yun Chen, Chu Pei (TW)

(73) Assignee: Actherm Inc., Chi Pei (TW)

( * ) Notice: Subject to any disclaimer, the term of this patent is extended or adjusted under 35 U.S.C. 154(b) by 0 days.

(21) Appl. No.: 10/309,029

(22) Filed: Dec. 4, 2002

(65) Prior Publication Data

US 2004/0066836 A1 Apr. 8, 2004

(30) Foreign Application Priority Data

Oct. 7, 2002 (TW) ........................................ 91123133 A

(51) Int. Cl.⁷ ............................ G01K 1/00; G01K 7/00
(52) U.S. Cl. ..................... 374/208; 374/185; 374/163
(58) Field of Search ................................. 374/163, 183, 374/185, 179, 208; 600/549; 338/28, 229, 267, 233, 274

(56) References Cited

U.S. PATENT DOCUMENTS

| | | | | |
|---|---|---|---|---|
| 2,307,626 A | * | 1/1943 | Kelly et al. | ..................... 338/28 |
| 2,588,014 A | * | 3/1952 | Knudsen | ..................... 338/28 |
| 3,147,457 A | * | 9/1964 | Gill et al. | ..................... 338/28 |
| 3,232,794 A | * | 2/1966 | Korton | ..................... 136/233 |
| 3,530,718 A | * | 9/1970 | Ehio | ........................ 374/158 |
| 4,411,535 A | * | 10/1983 | Schwarzschild | ............ 374/165 |
| 4,487,208 A | * | 12/1984 | Kamens | ....................... 600/549 |
| 4,497,324 A | * | 2/1985 | Sullivan et al. | .............. 600/549 |
| 4,603,026 A | * | 7/1986 | Martin | ................... 264/272.18 |
| 4,934,831 A | * | 6/1990 | Volbrecht | ..................... 374/183 |
| 5,367,282 A | * | 11/1994 | Clem | ......................... 338/22 R |
| 5,811,761 A | * | 9/1998 | Kita et al. | ................... 219/270 |
| 6,338,571 B1 | * | 1/2002 | Chen | ........................... 374/208 |
| 6,637,935 B2 | * | 10/2003 | Chen | ........................... 374/185 |
| 6,676,290 B1 | * | 1/2004 | Lu | ............................... 374/163 |
| 2002/0198465 A1 | * | 12/2002 | Fox et al. | ................... 600/549 |
| 2004/0071182 A1 | * | 4/2004 | Quinn et al. | ................... 374/1 |
| 2004/0071190 A1 | * | 4/2004 | Chang | ......................... 374/185 |
| 2004/0105487 A1 | * | 6/2004 | Chen | ........................... 374/163 |

FOREIGN PATENT DOCUMENTS

| | | | | | | |
|---|---|---|---|---|---|---|
| JP | | 60178328 A | * | 9/1985 | ............ | G01K/7/18 |
| JP | | 63101721 A | * | 5/1988 | ............ | G01K/7/22 |
| JP | | 01233333 A | * | 9/1989 | ............ | G01K/7/22 |
| JP | | 03140829 A | * | 6/1991 | ............ | G01K/7/22 |
| JP | | 05223648 A | * | 8/1993 | ............ | G01K/7/02 |

* cited by examiner

Primary Examiner—Diego Gutierrez
Assistant Examiner—Mirellys Jagan
(74) Attorney, Agent, or Firm—Leong C. Lei

(57) ABSTRACT

A rapid response electronic clinical thermometer is disclosed. The clinical thermometer comprises a measuring end portion adhered to a metal head portion having a temperature sensing element and a conductive wire joining the temperature sensing element, characterized in that the conductive wire is adhered to the inner wall of the metal head portion such that the conductive wire is not a heat dissipation portion for heat energy surrounding the sensing element, and further acts as a source of heat energy compensation so as to indicate the accurate temperature, reducing the temperature measuring time.

7 Claims, 10 Drawing Sheets

US 6,854,882 B2

RAPID RESPONSE ELECTRONIC CLINICAL THERMOMETER

BACKGROUND OF THE INVENTION

1. Technical Field of the Invention

The present invention relates to a clinical thermometer, and in particular, an electronic thermometer having a measuring end portion being adhered with a metal head portion having a temperature sensing element and a conductive wire joining the temperature sensing element, with the conductive wire being adhered to the inner wall of the metal head portion such that the conductive wire is not a heat dissipation portion for heat energy surrounding the sensing element, and the conductive wire further acts as a source of heat energy compensation so as to rapidly indicate the accurate temperature, reducing the time required for measuring temperature.

2. Description of the Prior Art

Normally, a conventional electronic clinical thermometer takes a long time to measure body temperature and it was only during 1980–1990, that rapid respond electronic clinical thermometers became utilized. However, a number of expensive components are employed in these thermometers. Recently available electronic clinical thermometers have been able to measure the temperature of a person rapidly, and the size of the thermometer has become small. This is due to the reduction in size with respect to some of the components used in the thermometer. The drawbacks of conventional clinical thermometer are as follows:

Referring to FIG. 1, there is shown a conventional clinical thermometer comprising a body 10, a measuring end 21 connecting the body 10, a metal head portion 22 provided at the end portion of the measuring end 21, and the body 10 comprises a display element 13 and a press button switch 14. As shown in FIG. 2, a conventional clinical thermometer having a metal head portion 22 contains a thermistor 23 which is connected to a conductive wire 25.

As shown in FIG. 3, a major part of the heat energy is lost to form a heat stream 32. Due to the large capacity of metal head 22, it takes about 60–90 seconds to reach equilibrium.

The above conventional clinical thermometer has the drawback of large heat capacity.

FIG. 4 shows a conventional clinical thermometer which has been granted as U.S. Pat. No. 4,183,248. The interior of the measuring end has a heating element 48.

FIG. 5 shows the loss of heat energy from the measuring end portion to form heat stream 52 and 53. Due to the fact that the heat stream is reduced and therefore heat equilibrium can be obtained easily, the measuring time is shorter by 4 to 15 seconds.

U.S. Pat. No. 5,632,555 discloses a clinical thermometer having a microprocessor to predict the measuring result by way of predictive algorithm. The required time for measuring is 4 to 15 seconds.

PCT WO00/22396 discloses a rapid measuring of a clinical thermometer. As shown in FIG. 6, the thermometer comprises a body 61 having a measuring end 62, a metal head portion 63 and a sensing element 64 within the metal head 63.

The conventional clinical thermometers with patents mentioned above focus on reducing the media within the metal head portion and the metal head portion without considering the influence of the conductive wire on the heat equilibrium. Accordingly, it is an object of the present invention to mitigate the above drawbacks by providing a rapid respond electronic clinical thermometer.

SUMMARY OF THE INVENTION

Accordingly, it is an object of the present invention to provide a rapid respond electronic clinical thermometer having a measuring end portion being adhered with a metal head portion having a temperature sensing element and a conductive wire joining the temperature sensing element, characterized in that the conductive wire is adhered to the inner wall of the metal head portion such that the conductive wire is not a heat dissipation portion for heat energy surrounding the sensing element, and further acts as a source of heat energy compensation so as to rapidly indicate the accurate temperature, reducing the temperature measuring time.

Yet another object of the present invention is to provide a rapid respond electronic clinical thermometer, wherein the sensing element and the linked conductive wire are fully or largely adhered with the inner wall of the metal head portion.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
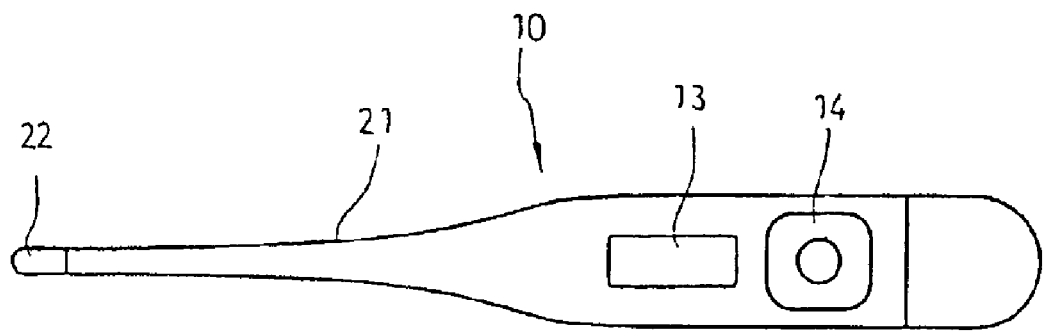
FIG. 1 is a schematic view of a conventional electronic clinical thermometer.
Figure 2:
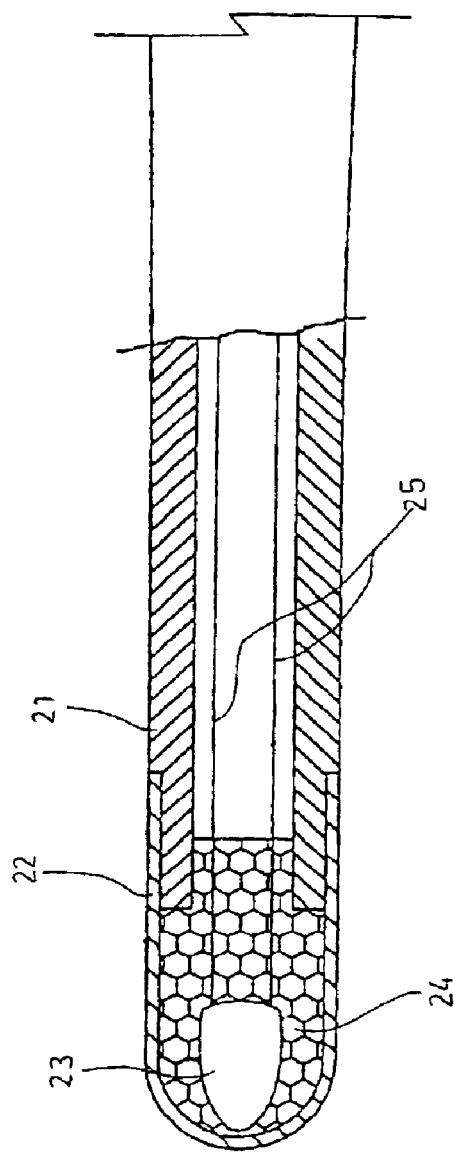
FIG. 2 is a schematic view of the internal structure of the metal head portion of a conventional electronic clinical thermometer.
Figure 3:
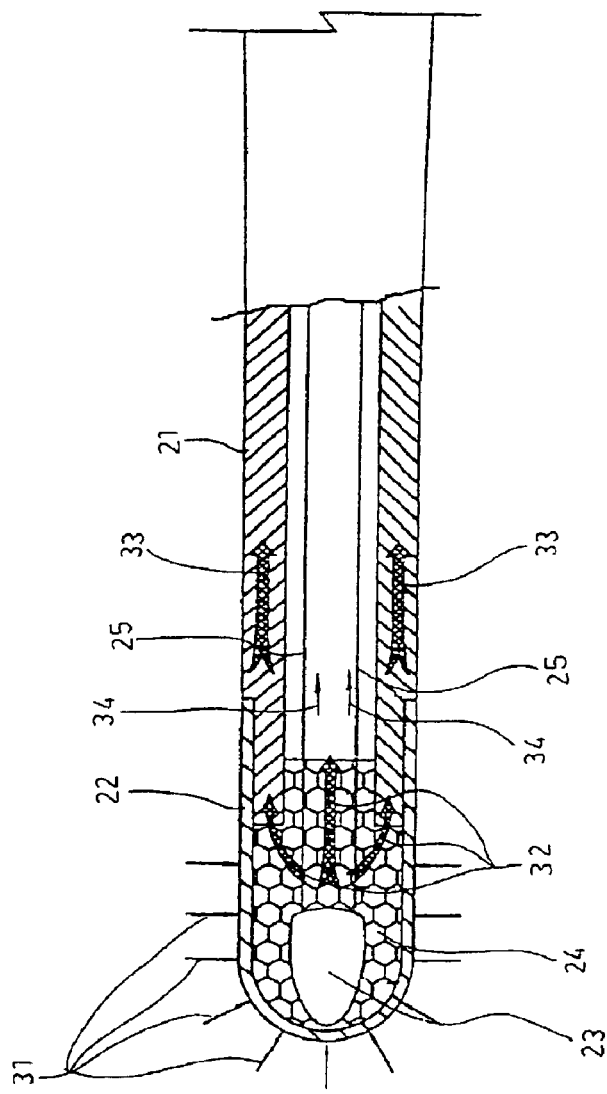
FIG. 3 is a schematic view of the heat stream in the course of measuring the structure of FIG. 2.
Figure 4:
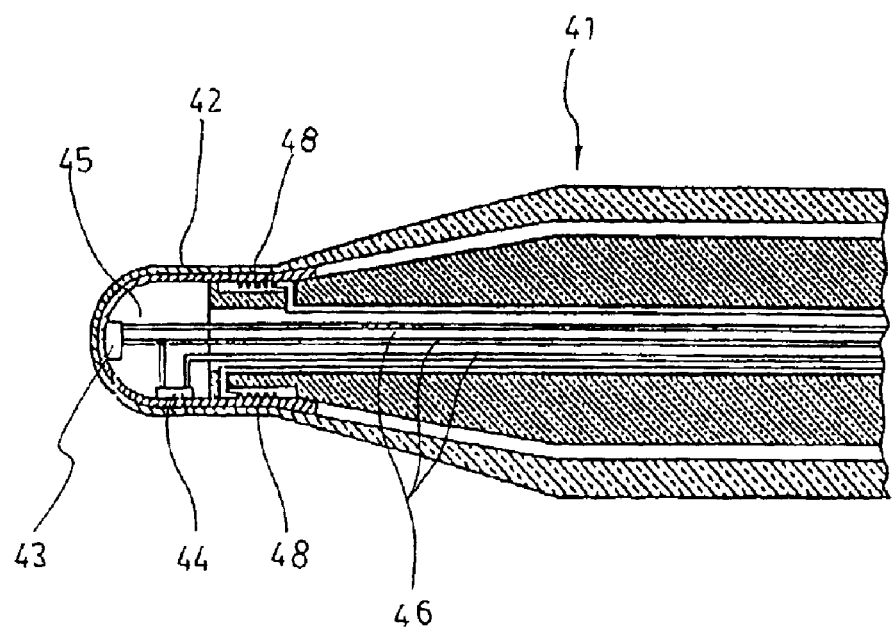
FIG. 4 is a schematic view of the internal structure of the metal head portion disclosed in U.S. Pat. No. 4,183,248.
Figure 5:
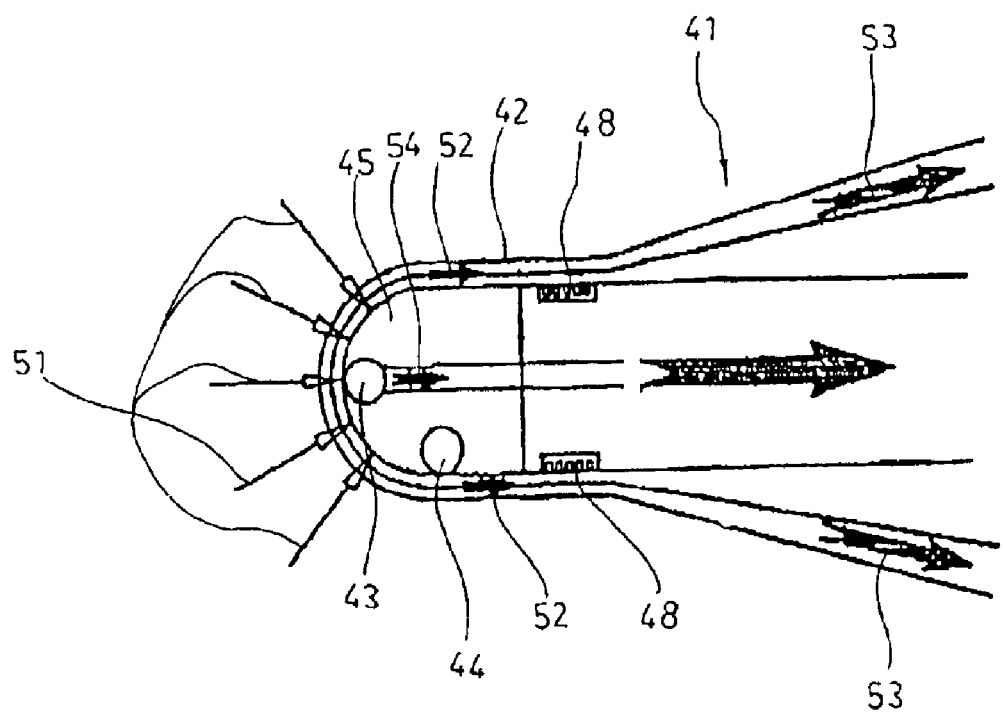
FIG. 5 is a schematic view of the heat stream in the course of measuring of the structure of FIG. 4.
Figure 6:
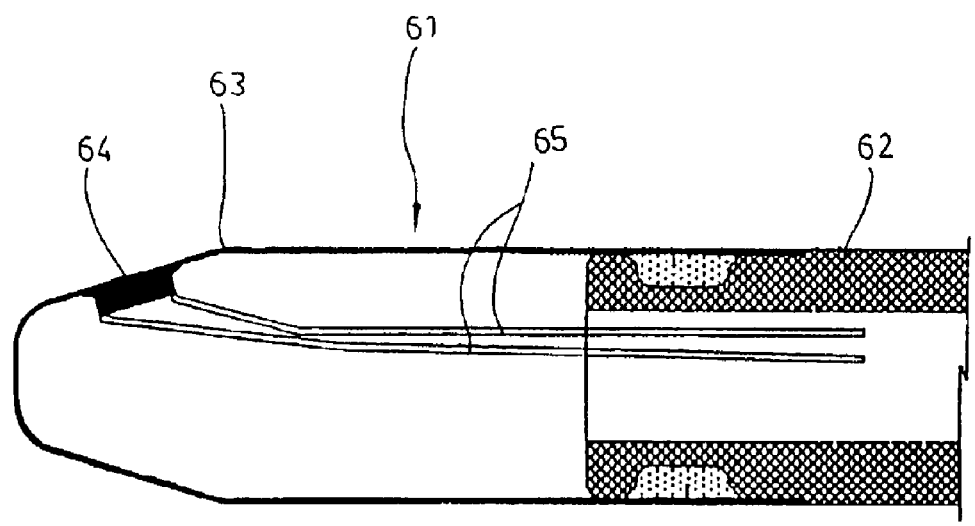
FIG. 6 is a schematic view of the internal structure of the metal head portion disclosed in PCT WO/00/22396.
Figure 7:
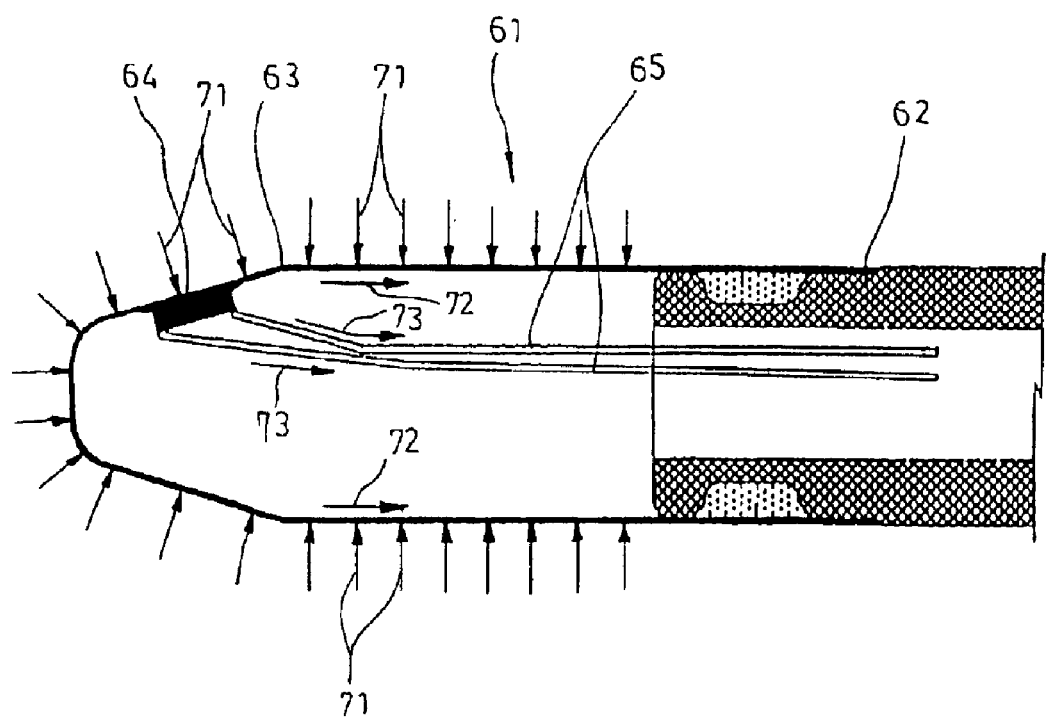
FIG. 7 is a schematic view of the heat stream in the course of measuring the structure of FIG. 6.
Figure 8:
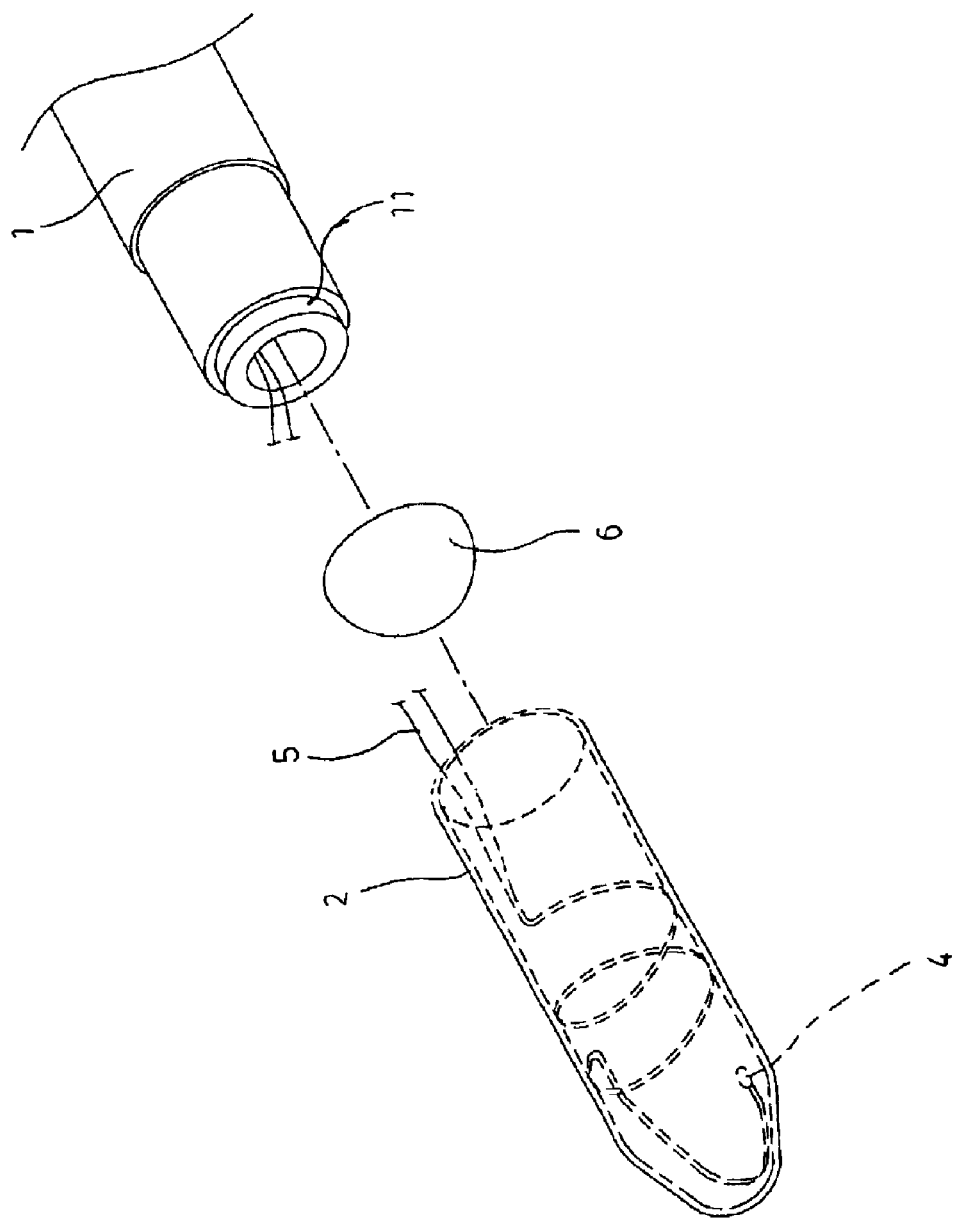
FIG. 8 is a perspective view of the structure of the metal head portion of the measuring end of the present invention.
Figure 9:
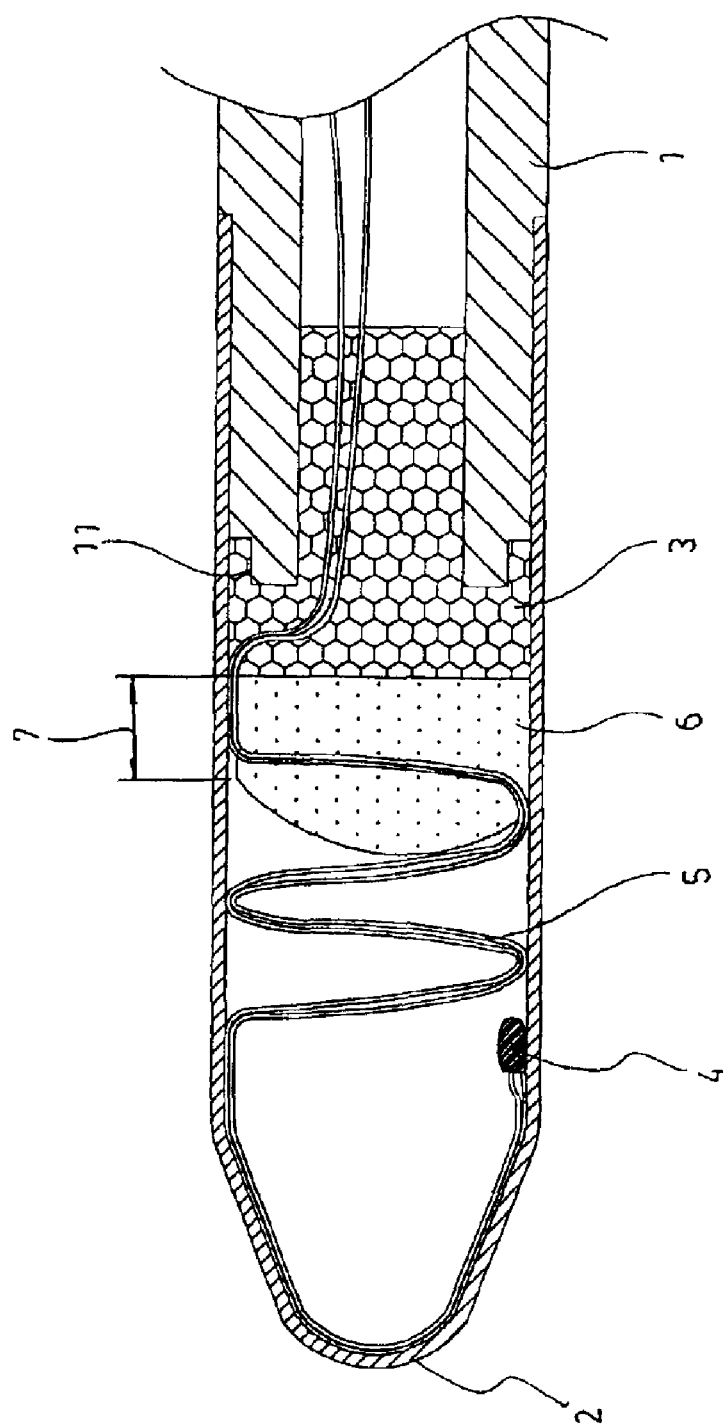
FIG. 9 is a schematic view of the internal structure of the metal head portion of the measuring end of the present invention.

Referring to FIGS. 8 and 9, there is shown a clinical thermometers having a measuring end 1 with an end portion connected to a metal head portion 2. The measuring end 1 and the metal head portion 2 can be mounted with an adhesive agent. A stepped recess 11 is provided at the external side of the stepped portion and the recess 11 and the metal head portion 2 are adhered and secured with an adhesion agent 3, which is waterproof.

A temperature sensing element 4 is provided at the interior of the metal head portion 2 and the sensing element 4 is a resistance dependent of temperature, for instance, the conventional thermistor 503ET, and the sensing element 2 are connected to the conductive wire 5 so as to connect with the main circuit for calculation and temperature display.

Within the metal head portion 2, due to the natural elastic force of the wire 5 and the adhesion agent 3, the sensing element 4 is connected to the conductive wire 5 so that the entire or major part of the configuration is in contact with the inner wall of the metal head 2. Larger diameter loops of the conductive wire 5 rotatingly force the conductive wire 5 to be inserted into the metal head portion 2. The conventional conductive wire 5 is copper wire, which has excellent elasticity. The sensing element 4 and the connected conductive wire 5 are directly adhered onto the inner wall of the metal head portion 2 to form a configuration having firm contact.

The conductive wire 5 which is adhered at the inner wall of the metal head portion 2 is fully or mostly at least 0.3 cm, and preferably 3 cm.

The rear end of the wire 5 connecting the metal head portion 2 together with the fixing element 6 has a low thermal coefficient to secure the conductive wire 5 and prevent it from moving. The fixing element 6 includes polystyrofoam material. The end portion of the measuring end 1 is connected to the metal head 2 which can be used as support for adhesion agent 3 so as to prevent adhesion agent 3 from spreading to the front end of the metal head portion 2.

Before the fixing element 6 is inserted with a metal head 2, the fixing element 6 is a hemisphere having a large diameter metal head 2. When the fixing element 6 is inserted in the metal head portion, the surrounding edge 7 is squeezed and will be in contact with the inner wall of the metal head portion. Thus, the contact area of the metal head portion 2 with the surrounding ring side 7 is small and the capacity is reduced.

Figure 10:
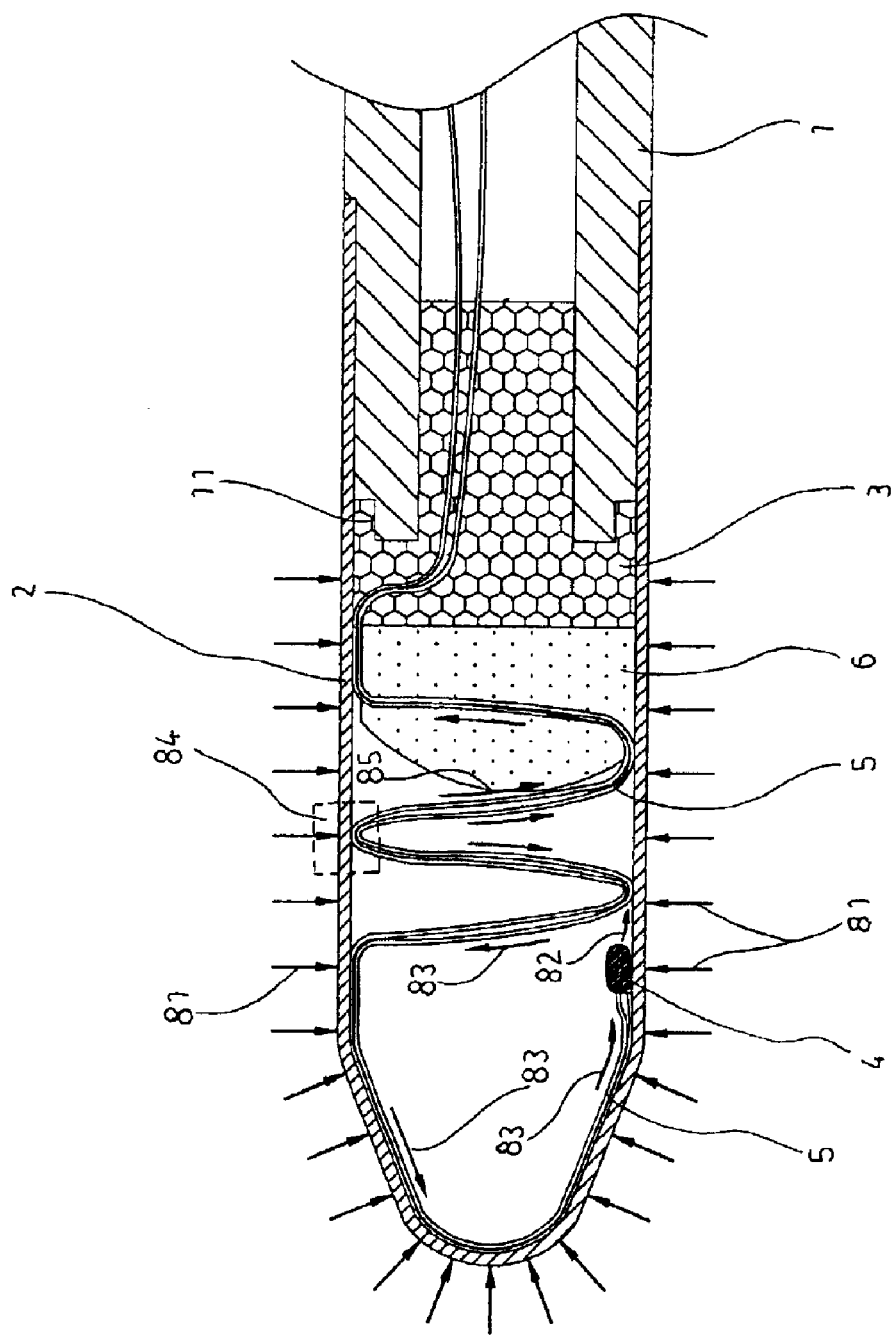
FIG. 10 is a schematic view of the heat stream in the course of measuring the structure of FIG. 9 in accordance with the present invention.

Referring to FIG. 10, when the clinical thermometer is used for measuring, the heat energy from the person undertaking temperature measurement is transferred to the metal head portion 2, and then, for instance, the heat stream 81, and then to the sensing element 4. At the same time, the metal head portion 2 will produce heat stream 82. Due to the fact that the heat energy supplied from the outside of the metal head 2 is sufficient, the heat stream 82 is not large. In addition, the sensing element 4 relative to the heat capacity of the conductive wire 5 is quite large, and more heat energy is needed in order to achieve heat equilibrium. The conductive wire 5 is a metallic material, and the heat conductivity is good and is adhered at the inner side of the metal head portion 2, thus the produced heat stream 83 will be transferred by the conductive wire 5 to the sensing element 4. Obviously, the conductive wire 5 will produce heat stream 85 along the adhesion agent 3 region and the measuring end 1. Due to the length of the adhered conductive wire 5 and the closely adhered metal head portion 2, heat compensation from outside is rapid, an appropriate region on the conductive wire 5 will form a heat resistance 84, so that the heat stream 82 will not affect the surrounding of the sensing element 4.

By an analysis of heat equilibrium at the surrounding region of the sensing element 4, it is evident that the heat stream of the conductive wire 5 portion will be dispersed differently as compared to the previous heat stream. The heat energy is directed to the sensing element 4 when the surrounding of the metal head portion 2 has attained heat equilibrium, the heat equilibrium of the conductive wire 5 and the sensing element 4 will be rapidly achieved without additional heat or using expensive elements, reducing the time for measuring. In accordance with the present invention, the measuring time is reduced to 10 to 25 seconds.

Further, the length of the metal head portion 2 is longer than the conventional length (generally 9 mm). Thus, the interior space of the metal head portion 2 is increased, facilitating the winding of the conductive wire 5 so as to increase the heat-sensing contact surface with the skin.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A rapid response electronic clinical thermometer having a measuring end portion adhered to a metal head portion having a temperature sensing element and a conductive wire joining the temperature sensing element, characterized in that the conductive wire is adhered to an inner wall of the metal head portion such that the conductive wire is not a heat dissipation portion for heat energy surrounding the sensing element, and further acts as a source of heat energy compensation so as to rapidly indicate a temperature, thereby reducing temperature measuring time, wherein the conductive wire adhered to the inner wall of the metal head portion is at least 0.3 cm in length, and a fixing element is mounted within the metal head portion, the fixing element being a hemisphere shape structure having an outer diameter that is larger than an inner diameter of the metal head portion before the fixing element is mounted into the metal head portion, and the inner wall of the metal head portion is closely engaged with an outer circumferential surface of the fixing element after the fixing element is mounted into the metal head portion, thereby firmly keeping the conductive wire in position.

2. The rapid response electronic clinical thermometer of claim 1, wherein the sensing element and the joined conductive wire are fully or largely adhered to the inner wall of the metal head portion.

3. The rapid respond electronic clinical thermometer of claim 1, wherein a front half of the conductive wire is mounted to the inner wall of the metal head portion by direct adhesion and a back half is coiled and in contact with the inner wall of the metal head portion.

4. The rapid response electronic clinical thermometer of claim 1, wherein the conductive wire is coiled fanning loops of a diameter larger than that of the metal head portion, and is forcefully inserted into the metal head portion by rotating the conductive wire loops into the metal head portion.

5. The rapid respond electronic clinical thermometer of claim 1, wherein a recess is formed at an external side of the measuring end portion.

6. The rapid respond electronic clinical thermometer of claim 1, wherein the fixing element has a low thermal coefficient and has a function to provide a support to the conductive wire and an adhesive agent for adhering the measuring end portion to the metal head portion so as to prevent distribution of the adhesive agent towards the metal head portion.

7. The rapid respond electronic clinical thermometer of claim 6, wherein the fixing element is made from a material of low heat transfer coefficient.

* * * * *

UNITED STATES PATENT AND TRADEMARK OFFICE
CERTIFICATE OF CORRECTION

PATENT NO. : 6,854,882 B2  
APPLICATION NO. : 10/309029  
DATED : February 15, 2005  
INVENTOR(S) : Min-Yeng Chen Page 1 of 1

It is certified that error appears in the above-identified patent and that said Letters Patent is hereby corrected as shown below:

On the title page, item [75] should read—Min-Yeng Chen--.

Signed and Sealed this

Twenty-second Day of August, 2006

JON W. DUDAS  
*Director of the United States Patent and Trademark Office*

UNITED STATES PATENT AND TRADEMARK OFFICE
CERTIFICATE OF CORRECTION

PATENT NO. : 6,854,882 B2 Page 1 of 1
APPLICATION NO. : 10/309029
DATED : February 15, 2005
INVENTOR(S) : Min-Yeng Chen It is certified that error appears in the above-identified patent and that said Letters Patent is hereby corrected as shown below:

On the title page, item [75] should read—Min-Ying Chen--.

This certificate supersedes Certificate of Correction issued August 22, 2006.

Signed and Sealed this

Twentieth Day of February, 2007

JON W. DUDAS
*Director of the United States Patent and Trademark Office*